United States Patent Office 3,442,802
Patented May 6, 1969

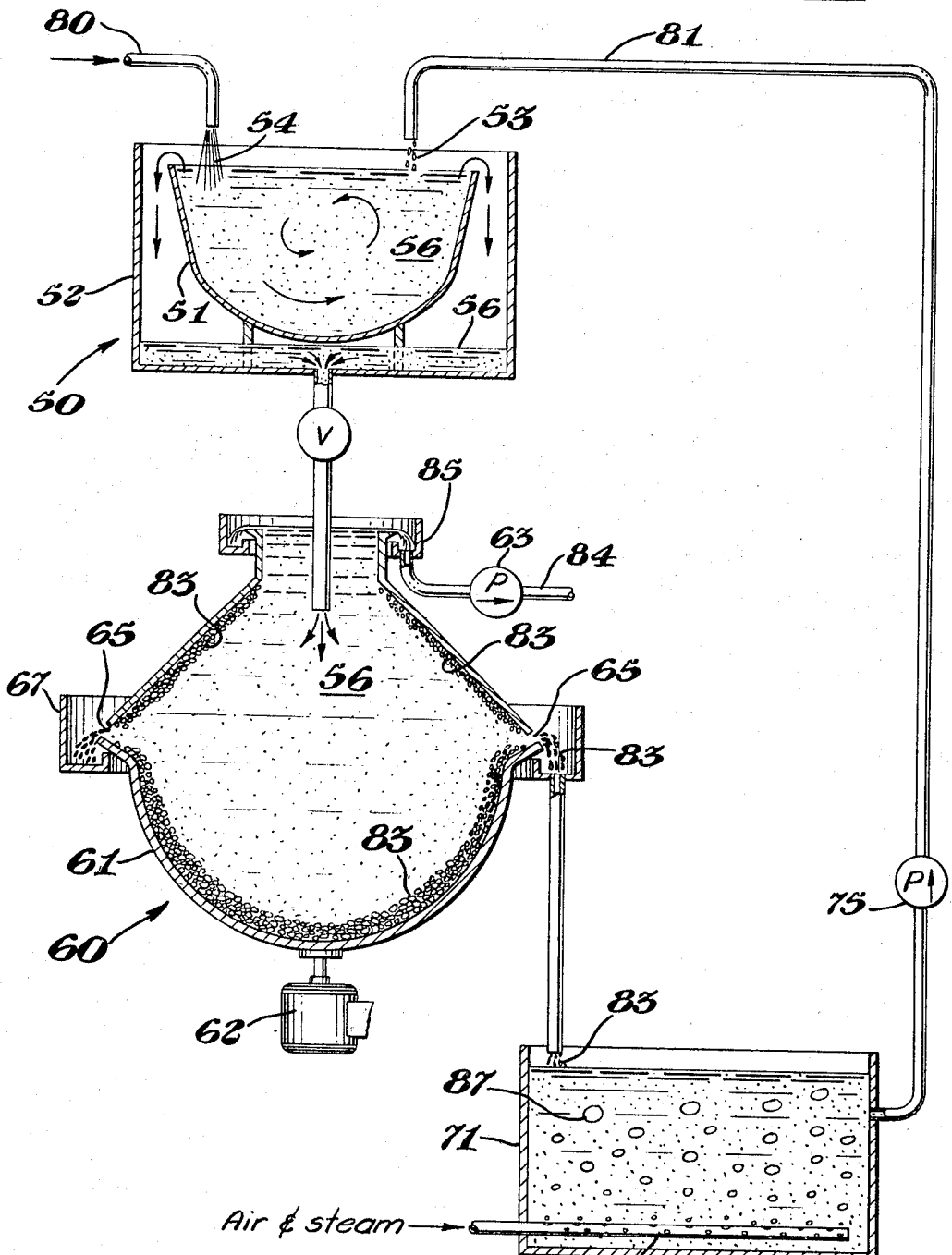

3,442,802
OXIDATION OF AQUEOUS ORGANIC DISPERSIONS
Charles E. Hamilton, James L. Teal, and James A. Kelly, Midland, Mich., assignors to The Dow Chemical Company, Midland, Mich., a corporation of Delaware
Filed Jan. 25, 1967, Ser. No. 611,674
Int. Cl. B01d 17/00
U.S. Cl. 210—63
18 Claims

ABSTRACT OF THE DISCLOSURE

Aqueous organic dispersions, including aqueous solutions and suspensions of organic materials are mixed with a finely divided manganese dioxide catalyst having a surface area of at least 10 square meters per gram. The catalyst and organics are contacted with gaseous oxygen to oxidize the organics and regenerate the catalyst. Such contacting can be carried out from the ambient temperature of the waste up to about 500° C. This may take place in situ within the liquid body of treated dispersion or in a sludge of organic material and catalyst separated from the dispersion. When the oxidation reaction is carried out in aqueous dispersions, liquid confining surfaces must be of essentially non-electroconducting materials to obtain efficient rates. The ratio of manganese dioxide to disperse organic material is at least 0.5:1, preferably at least 5:1. The pH of the system should be within the range from about 5.5 up to about 8.5 for optimum operation.

---

Figure 1:
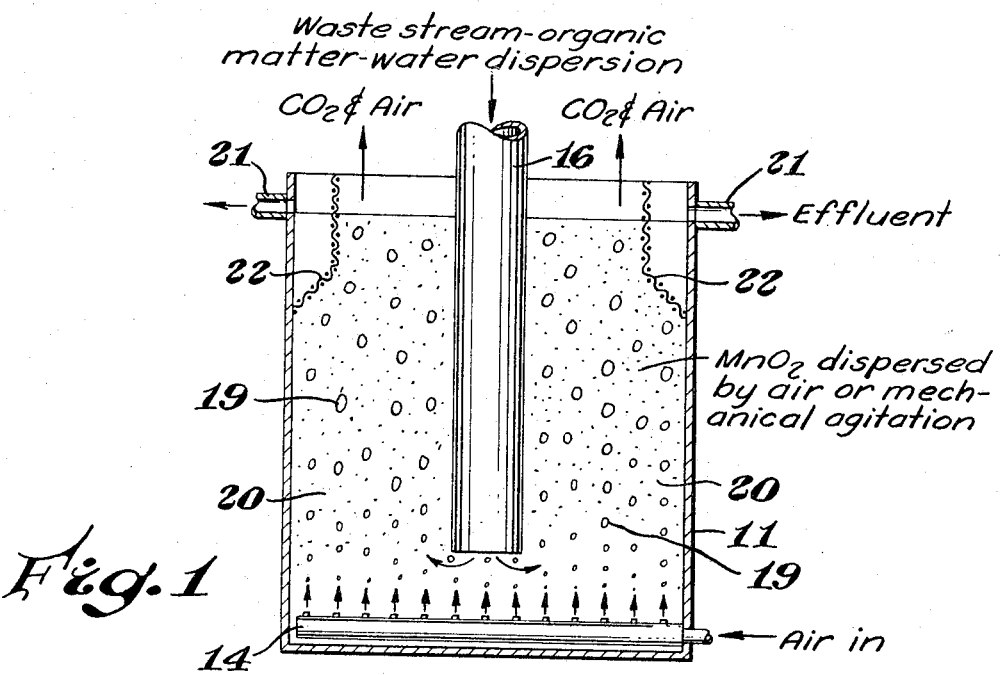

Due to ever-increasing water pollution, research to develop counter measures and to generally improve waste disposal processes has gained considerable impetus in recent years. Numerous physical, chemical and biochemical treatment processes are being evolved. Of background interest to the instant invention is the relatively limited technology which may be classified as catalytically promoted oxidation processes.

One of the earliest references known to applicants in this field is U.S. 2,029,958, issued Feb. 4, 1936. This patent teaches the catalytically promoted oxygenation of organic components in waste streams. The catalysts are indicated to be a group of metal oxides and salts in which the metal can be oxidized at least two valence units. The metals are employed in a low valence form and, as they oxidize in the presence of waste, the oxidation of organic components is said to be promoted.

West German Patent 809,897, issued Oct. 25, 1949, states that matrix materials containing manganese dioxide are worthwhile catalysts for the oxidation of waste components with oxygen. Manganese dioxide is mixed in ground form with calcined lime or magnesite and, after adding water, the resulting mixture is dried and granulated to provide a matrix material containing manganese dioxide said to be useful as an oxidation catalyst.

In U.S. 2,690,425, issued Sept. 28, 1954, reference is made to the catalytic oxidation of aqueous wastes. The described process comprises mixing the waste with air (i.e., oxygen) and passing the resulting mixture over a suitable oxidation catalyst at an elevated temperature and pressure. A large number of metallic oxides are said to be satisfactory as catalysts, among which there is mention of manganese oxides.

Generally, catalytic oxidation techniques, such as those described above, have gained little or no acceptance. This conclusion is reflected in the recent Advanced Waste Treatment Research Summary Report, No. 14 (1965) which stated:

"Because of the many problems arising from the complexity and variability of waste water systems and of the difficulties associated with the use of catalysts, the achievement of a completely continuous absorption-oxidation process does not appear probable." 14 AWTR Summary Report, page 79 (April 1965).

The present invention, of which there are several major variations and distinct embodiments, is directed to a process involving the catalytic oxidation of organic materials in aqueous dispersion. A particular object is to provide an improved waste treatment process. A further object is to provide a more efficient process for the adsorption and catalytic oxidation of organic components dissolved in industrial and domestic waste streams. It is a still further object of the invention to provide a process for the catalytic oxidation of waste streams which can be operated at the ambient temperature of the waste. Still another object is to provide a process for flocculating and separating organic solids from aqueous suspension. The foregoing objects, and other benefits which will become apparent hereinafter, are accomplished according to the following invention and discoveries.

The present invention is based upon several discoveries and technical innovations which, taken together, combine to provide efficient processes for the removal of organic components from aqueous dispersions and the catalytic oxidation thereof. The organic components can be present in the aqueous system as suspended or dissolved solids. Although applicable to more concentrated systems the invention is particularly useful for the removal of organic components from relatively dilute aqueous dispersions thereof. Illustrative of such dispersions are industrial and domestic wastes and dilute manufacturing process streams containing a disperse organic phase. By "dilute" is meant dispersions with less than about 2 percent by weight of dissolved and suspended solids. The processes described herein, although related in the nature of the catalyst used, differ in significant procedural steps and results achieved.

The instant invention particularly involves the discovery that certain forms of manganese dioxide, which have a surface area greater than about 10 square meters per gram, promote a high rate of reaction between oxygen supplied to the system as a gas and organic compositions in the presence of water. For effective operation, it is essential that the ratio of manganese dioxide to disperse organics be at least about 0.5:1, preferably at least about 5:1. It is also preferable that the pH of the system be within a relatively narrow range of from about 5.5 up to about 8.5.

The aforementioned oxidation of the disperse organic components in aqueous dispersions can be accomplished by mutually contacting oxygen and manganese dioxide with the components to be oxidized in situ within the liquid body of aqueous dispersion being treated. In such event, it has been discovered that the in situ rate of oxidation achieved is surprisingly enhanced by confining the treated dispersion with essentially non-electroconducting materials. By this is meant that at least the surfaces of materials of construction in confining contact with the aqueous dispersion are essentially resistant to electron transfer.

In a distinct and alternate mode of operation, the manganese dioxide is mixed with the aqueous stream wherein it function both as a settling aid for suspended solids and an excellent adsorbent of dissolved solids. The manganese dioxide in admixture with the extracted organic components is then separated from the dispersion as by filtration, centrifugation or sedimentation. The recovered sludge of catalyst and captured organics is blown with gaseous oxygen to oxidize the organics and regenerate the catalyst. Although effective regeneration of the catalyst is possible in the presence of electroconductive materials, best results are achieved particularly at ambient temperatures of the waste stream, when liquid contact with such materials is substantially avoided.

The temperature at which the mutual contacting of oxygen, manganese dioxide and the organics is carried out is not critical to operability. Effective oxidation may be achieved at essentially atmospheric temperatures. The aforementioned in situ oxidation process can be readily applied to municipal and industrial sewage treatment. Optionally, and with particular advantage in the aforementioned second embodiment involving oxidizing a wet concentrate of manganese dioxide and adsorbed or precipitated organics, the oxygen is contacted with the wet mass at an elevated temperature up to about 500° C. Best results are achieved at temperatures from about 100 to 200° C. Exposure to temperatures above about 200° C. should be of a relatively limited duration so as to avoid chemical reduction or phase change in the catalyst and consequent inactivation thereof.

Organics effectively removed from aqueous systems and oxidized include carbonaceous materials such as aromatic and aliphatic hydrocarbons, alcohols, phenolics, nitrogen, sulfur and/or oxygen containing heterocyclics, cellulosics, starch and various proteins. Generally, the components of aqueous systems susceptible to treatment in accordance with the invention can be characterized as those materials of an essentially organic nature containing carbon and one or more elements of the group of hydrogen, oxygen, nitrogen and sulfur.

The instant invention will be further illustrated by reference to the accompanying drawings in which FIGURE 1 is a schematic illustration of the process embodiment involving simultaneous, in situ contact adsorption and oxidation of disperse organics in a flowing aqueous stream.

Figure 2:
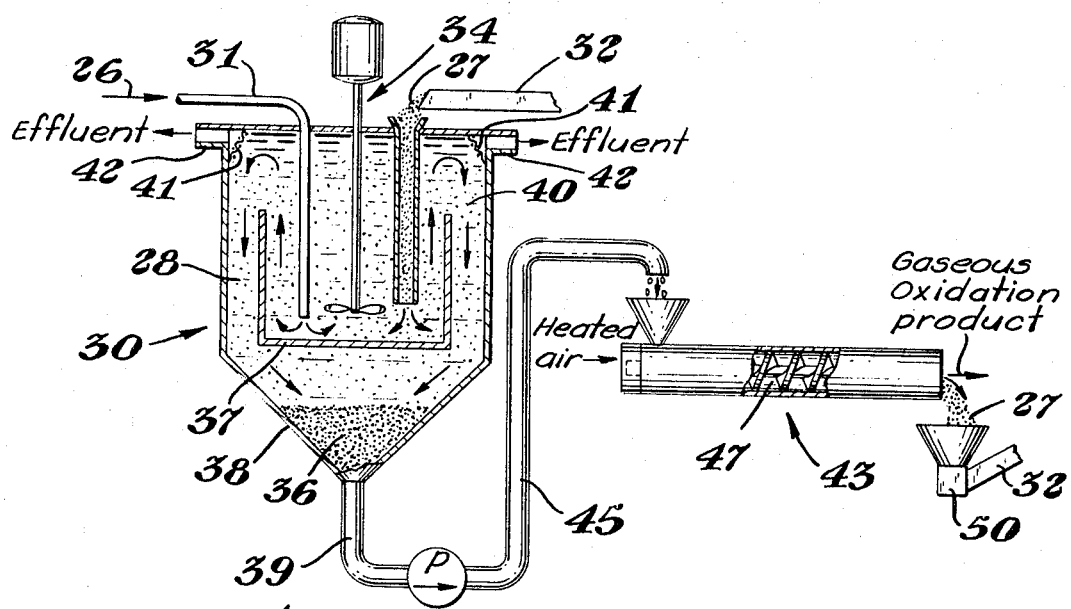

FIGURE 2 illustrates another mode of operation under the instant invention, whereby the disperse organics are captured or removed from the aqueous stream by adsorption and/or flocculation. After settling of the catalyst and captured organic matter, oxidation of the separated organics and catalyst reactivation is achieved in a second stage, which provides for recovery and recycle of the catalyst as particulate dry solids.

FIGURE 3 schematically shows the use of flow agitation to achieve initial contacting of an aqueous organic dispersion with recycling slurry of wet, regenerated catalyst. The mixture is passed into a centrifuge which separates the catalyst and captured organic matter as a sludge. This sludge is fed to a heated and aerated vessel for oxidation of the organics and regeneration of the catalyst in slurry form.

More particularly, in FIGURE 1 the process is carried out in an open tank 11 of an essentially non-electroconducting material. Suitable materials of construction for the tank 11 include plastics, ceramics, glass, concrete and the like. Steel, aluminum and other metals may be lined with electrically insulating materials to provide satisfactory confining surfaces. Disposed at the bottom of the tank 11 is an air dispersing header 14. A down pipe 16 is provided for introducing the aqueous stream into the tank 11. The contents of the tank 11 are agitated as a result of rising air bubbles 19 throughout the liquid slurry 20 of organic dispersion and manganese dioxide solids. Near the top of the tank 11 are outlets 21 through which liquid filtering through circumferential filter 22 is continuously discharged. Materials of construction for essentially all surfaces of equipment components in contact with a liquid slurry 20 are electrically nonconducting.

In operating the above equipment, an aqueous dispersion of organics such as a municipal or industrial waste stream which may contain both suspended and dissolved organic matter is introduced into the tank 11 through down pipe 16. The tank is charged with a given quantity of suitable manganese dioxide, having a surface area in excess of 10 square meters per gram. Manganese dioxide of the gamma crystalline form is preferred. A sufficient amount is used to provide an average solids ratio of manganese dioxide to disperse organic matter of at least about 0.5:1. In dilute dispersions, however, more efficient rates are achieved at catalyst/organics solids ratios of at least about 5:1. The term "solids" as used in the foregoing ratio refers to both dissolved and suspended organics. The flow rate of the dispersion is adjusted to provide an average liquid residence time within the tank 11 adequate to obtain desired oxidation of disperse organics. Depending upon the ratio of catalyst to disperse organics, efficiency of the air-solids contact and liquid temperature, useful results are obtained with liquid residence times of as little as a few seconds. Usually the residence time within the contact reaction zone will be within the range from about 4 minutes up to about 1 hour.

Although air is the most convenient source of gaseous oxygen, it is to be understood that oxygen or any other oxygen containing gas may be used.

In FIGURE 2, an aqueous dispersion of organics 26 and manganese dioxide catalyst 27 are fed to a stirred mixing vessel 37 through feed lines 31 and 32, respectively. Stirring is provided by means of a motor powered mixer 34. From the mixing tank 37, a slurry of aqueous organic dispersion and catalyst solids overflows into a settling tank 38. From this tank 38, liquid effluent of reduced organic content, is withdrawn at overflow outlets 42. Screens 41 in front of the outlet 42 prevent the passage of suspended solids with the effluent liquid.

The particles 40 of dense manganese dioxide catalyst and captured organics settle to the bottom of the settling tank to form a sludge 36. This is withdrawn at outlet 39 and pumped through a line 45 to an oxidation reactor 43. The sludge 36 is moved through the reactor 43 by means of a rotating auger 47. Heated air is blown through the reactor 43 to oxidize organics and regenerate the inorganic catalyst. The dried catalyst solids 27 are dumped into a blower 50 and recycled through return line 32 as feed to the mixing vessel 37.

Operation of the process according to the mode illustrated by FIGURE 2 involves providing sufficient mechanical agitation in the mixing vessel 37 to achieve uniform contacting of catalyst solids with aqueous dispersion to be treated. The resulting slurry is settled in settling tank 38 because of the dense manganese dioxide particles. Both adsorption of dissolved organics and flocculation of any suspended organics are accomplished with the use of the manganese dioxide. Oxidation of captured organic materials can be readily achieved by simply blowing air through the recovered catalyst-organic sludge at ambient temperatures. However, to accelerate the process and at the same time dry the regenerated catalyst to provide particulate solid materials for recycle to the contact-adsorption phase of the operation, the catalyst is heated by blowing with heated air. Temperatures up to about 500° C. can be used. Preferably the heating is carried out at temperatures within the range from about 100 up to 200° C. Oxidation products are carried out of the reactor 43 with the gaseous discharge.

The oxidation and catalyst regeneration rates are significantly improved by conducting the oxygenation of the sludge in vessels in which the sludge confining surfaces are essentially non-electroconducting. However, this condition is not necessary to achieve useful oxidation rates in concentrates of catalyst and organic materials, especially at higher treatment temperatures. In other words, the concentrate of catalyst and organics can be effectively oxygenated in the presence of electroconducting materials of construction, especially at higher treatment temperatures.

A further embodiment of the invention involving distinct contact adsorption and oxidation phases is shown in FIGURE 3. The basic processing units are a solids-liquid contactor 50, centrifuge 60 and catalyst-regenerator 70. The solids-liquid contactor 50 comprises a flow mixed vessel 51, which has a relatively small volume in relation to the flow rate of incoming liquid dispersion. Entry of the liquid dispersion 54 from feed line 80 is directed downwardly and tangential to one side of the vessel 51, with the consequence that liquid contents of the vessel undergo violent agitation. In this manner a liquid slurry 56 of regenerated manganese dioxide 53, supplied from slurry return line 81, is formed with influent liquid dispersion 54, which is to be purified. Overflow from the flow-mixed vessel 51 spills into a holding tank 52. The latter drains the liquid-catalyst slurry 56 into the bowl 61 of the centrifuge 60. A sludge 83 of catalyst and captured organics is formed on the inside surface of the bowl 61. The sludge 83 is withdrawn at discharge nozzles 65. An essentially solids-free clarified effluent 84 overflows the bowl 61 and is recovered in effluent trap 85. From this trap 85, it is withdrawn by means of pump 63 and discharged through line 84.

The sludge 83 is collected outside the bowl 61 in a sludge trap 67. The sludge then flows by gravity into catalyst regenerator 70 comprising an open tank 71 equipped with air and steam sparging means 72. Agitation within the tank is provided by bubbles 87 rising through the sludge 83. Regenerated but still wet catalyst slurry, from which the captured organics have been essentially separated by oxidation, is recycled by means of pump 75 through return line 81 to the flow-mixed vessel 51.

During operation, an aqueous dispersion 54 such as a municipal waste stream is fed to the flow-mixed vessel 51 at a flow rate sufficient to induce desired mixing therein with the returning regenerated catalyst slurry 53. Although manganese dioxide is essentially insoluble, it will be necessary from time to time to replenish the small amount that may be lost in the effluent waste stream 84. Although through extended use, the catalyst solids may tend to accumulate non-oxidizing components of the waste. Such solids may tend to become less active after several cycles, in which event it may become desirable to periodically replace the entire amount of catalyst with fresh material.

The time required for oxygenation in the catalyst regenerator 70 will vary according to the difficulty of oxidizing the organic waste components and the temperature at which the slurry is maintained. In any event it has been discovered that the oxidation can be substantially completed and the catalyst regenerated without drying the catalyst solids. Normally this can be accomplished by sparging air into the slurry and preferably heating the same as by blowing in steam at a temperature from about 220 up to 400° F. This may be accomplished in an average time of from about 0.5 up to as much as about 30 minutes.

Studies conducted in evaluating the instant invention have shown that the capture of organics from aqueous dispersions and the oxidation cycle can be repeated, with a given charge of manganese dioxide numerous times. In fact the cycles may be continued almost indefinitely, unless the catalyst life is shortened because of association with nonoxidizable components in the aqueous dispersion being treated, or because the conditions imposed during oxidation tend to deactivate the catalyst. For example, manganese dioxide may change in chemical composition, i.e., the manganese dioxide may be chemically reduced by components of the waste stream. Generally manganese dioxide catalyst of the invention exhibits excellent stability to the variable environmental conditions imposed upon it as a result of contact and regeneration in the presence of numerous waste materials.

Useful manganese dioxide containing catalysts comprise finely divided manganese dioxide of a crystalline structure characterized by a surface area of at least 10 square meters per gram. Surface area as used in this context is determined by the technique of measuring nitrogen adsorption on the catalyst material according to Emmett, ASTM, STP 51. Suitable materials include the chemically precipitated crystalline forms of manganese dioxide such as alpha, gamma, epsilon and rho forms and the naturally occurring gamma form. These are normally finely divided particulate materials. By "finely divided" is meant an average particle size which will pass a No. 14 screen of the U.S. Standard Series. Although manganese dioxide as generally expressed herein indicates the chemical combination of one manganese atom with two atoms of oxygen, it is to be understood the useful catalyst materials may vary in chemical analysis from about 1.7 to about 2.0 atoms of oxygen for each atom of manganese. Moreover, as will be shown in the following illustrative examples, the manganese dioxide catalysts of the invention may contain minor proportions of other materials.

One of the surprising aspects of the process described herein is that the accumulative rate of removal for the in situ treatment (total effect of adsorption and oxidation) per gram of catalyst increases as the amount of catalyst is increased relative to the amount of disperse organic phase. In other words, by increasing the concentration of the catalyst, faster rates of removal per unit mass of catalyst are achieved. In the treatment of most aqueous dispersions, the manganese dioxide catalyst will be employed in amounts sufficient to form slurries having from 0.05 percent up to as much as 85 percent by weight of the catalyst, based on the weight of the total system.

Examples 1–4

To illustrate the comparative superiority of the particular manganese dioxide catalysts described herein, a series of simultaneous contact adsorption and oxidation experiments were carried out in a non-electroconducting 3-liter distillation flask made of glass. Two liters of distilled water containing 200 milligrams of phenol were added to the flask as a simulated organic dispersion. To this dispersion was added 2 grams of a potentially catalytic material, i.e., a 10:1 solids weight ratio of catalyst to disperse organic waste component.

The resulting mixture was stirred at room temperature for 3 hours after which the aqueous phase was analyzed for its phenol content to determine the amount of phenol adsorbed on the catalyst. Thereafter air, at the ambient room temperature, was blown through the agitated mixture, which was maintained at about 100° C. Periodically the aqueous phase was analyzed to determine its phenol content. When the phenol content dropped below about 25 milligrams per liter, another charge of 200 milligrams of phenol was added. The final measurement on phenol content was made 185 hours after initiation of the air blowing. In this manner the removal capacities of the catalyst were determined over several cycles.

The above operations using a wide range of potentially active catalyst materials revealed a surprisingly effective class of manganese dioxide compositions which achieved exceptional rates of removal and oxidation. One of the crystalline types of manganese dioxide used, the rho form, and secondly the alpha and epsilon forms with surface areas per gram of 10 square meters, or greater, demonstrated superior adsorption characteristics rendering them uniquely effective for utilization in the embodiment of the instant invention illustrated in FIGURE 2.

TABLE I

| Examples | Catalyst | Surface area [a] (m.²/gm.) | Adsorption [b] (wt. percent) | Removal [c] Rate |
|---|---|---|---|---|
| 1 | γ-MnO₂ | 56 | 2.0 | 2.3 |
| 2 | α-MnO₂ | 35 | 7.5 | 2.5 |
| 3 | ρ-MnO₂ | 31 | 13.2 | 2.7 |
| 4 | ε-MnO₂ | 10 | 6.8 | 2.2 |
| Mixed MnO₂ Catalysts (With 5 wt. percent of the specified Additive) | | | | |
| 5 | γ-MnO₂/CO₂O₃ | 70 | 0.5 | 1.0 |
| 6 | γ-MnO₂/NiO | 103 | 1.0 | 2.3 |
| 7 | γ-MnO₂/Fe₂O₃ | 119 | 0.9 | 1.5 |
| 8 | γ-MnO₂/CuO | 89 | 5.0 | 2.4 |
| 9 | γ-MnO₂/V₂O₅ | 114 | 0.04 | 0.02 |
| 10 | γ-MnO₂/Cr₂O₃ | 106 | 10 | 3.6 |
| Catalyst Composition of Example 1, U.S. 2,690,425 | | | | |
| 11 | Mn/Cr/Zn (80/47/20) | 0.14 | 0.1 | 0.3 |
| Catalyst Compositions of German Patent No. 809,897 | | | | |
| 12 | β-MnO₂/CaOH (1/1) | 1.8 | 0.05 | 0.005 |
| 13 | γ-MnO₂/CaOH (1/1) | 1.8 | 0.1 | 0.005 |
| 14 | β-MnO₂ | 2 | 0.1 | 0.04 |

[a] The surface area of the catalyst was determined according to the method of P. Emmett, ASTM STP 51, (1941).
[b] Wt. percent adsorption refers to phenol removed from solution in initial 3 hours based on the total weight of manganese dioxide charged.
[c] The removal rate =

$$\frac{\text{(milligrams of organic removed)}}{\text{(hours of contact) (grams of catalyst charged)}}$$

It will be observed from the above results that the naturally occurring β-crystalline form of manganese dioxide did not achieve an efficient rate of oxidation. Although the active forms of manganese dioxide were effective in admixture with other metal oxides, only the additives of nickel oxide, cupric oxide and chromic oxide showed an improved rate. As a general rule, little advantage is gained with these materials since the additives are leached out of the catalyst after a few cycles. The above manganese dioxide catalysts are operable at ambient or room temperature as well as elevated temperatures and thus can be used in the treatment of waste streams at their normal temperatures, thereby avoiding the need for expensive heated and pressurized systems.

The comparative Examples 12, 13 and 14 are self-explanatory comparative illustrations.

In various prior teachings, other forms of manganese oxides, hydroxides, and salts have been alleged to catalytically promote the removal or organic pollutants from waste streams. When tested according to the procedure outlined above, however, manganous oxide, manganous hydroxide, manganous nitrate and manganite $$(Mn_2O_3 \cdot H_2O)$$

were all coparatively ineffective on similar phenol solutions at the same pH and aeration rates.

Similarly, a large number of potentially surface active catalysts including $ThO_2$, $WO_3$, $CaNiPO_4$, $TiO_2$, $SnO_2$, $V_2O_5$, $AgO$, as well as bentonite, Fithian illite, taconite and charcoal were evaluated and found to be relatively deficient in removal (i.e., oxidation) rates. Only one material, this one $PbO_2$, was apparently more effective than the manganese dioxides specified herein, but it was chemically reduced and thus was functioning as an oxidant rather than a catalyst. In its soluble reduced state, it is unsatisfactory for the process.

Examples 15–18

In a series of further operations carried out in a manner similar to Example 1 above, except that the temperature of the slurry was about 25° C., the in situ adsorption and oxidation of aqueous phenol was carried out in several vessels made of electroconductive materials. The results, as compared to using a non-electroconducting confining surface, were as follows:

TABLE II

| Example No. | Vessel Walls | Relative Oxidation Rate |
|---|---|---|
| 15 | Stainless Steel | 1.0 |
| 16 | Nickel | 1.1 |
| 17 | Aluminum | 2.0 |
| 18 | Glass (comparative) | 5.0 |

Surprisingly, the electroconductive nature of the confining surfaces has an effect on the catalytic rate of oxidation.

Examples 19–24

To illustrate the general applicability of the oxidation process of the instant invention, further organic dispersions were treated in a manner similar to Example 1 except that only one charge of organics was treated in each run. The dispersions tested, reaction conditions and the removal rate are reported for each run in the following Table III.

TABLE III

| Example No. | Organic in Dispersion | Organic Conc. (mg./l.) | γ-MnO₂ Conc. (gm./l.) | Temp., °C. | Adsorption [a] (wt. percent) | Removal [b] Rate | Percent Removed [c] |
|---|---|---|---|---|---|---|---|
| 19 | Alkylbenzene sulfonate | 105 | 100 | 100 | | 0.03 | 100 |
| 20 | Propylene glycol | 1,880 | 100 | 100 | 1.1 | 0.1 | 80 |
| 21 | do | 3,725 | 100 | 100 | 2.2 | 0.1 | 80 |
| 22 | Kraft pulping liquor | 19,000 | 100 | 100 | 4.0 | 2.6 | 99 |
| 23 | NH₄ base pulping liquor | 125,000 | 100 | 100 | 4.0 | 2.0 | 95 |
| 24 | Filtered Raw Sewage | 126 | 10 | 25 | 0.6 | 0.3 | 85 |

[a] See footnote (b) Table I.
[b] See footnote (c) Table I.
[c] Percent removed refers to the maximum amount removed under the given conditions after at least 6 hour reaction time.

Examples 25–33

These examples illustrate the effect of the concentration of manganese dioxide on the rate of removal of organics from aqueous dispersion. A series of aqueous dispersions containing 100 milligrams of phenol per liter, were subjected to the catalytically promoted oxidation process of the invention at 100° C. The amount of catalyst used, relative to phenol in solution was increased incrementally for each run of the series. The removal rate, which was based on a reaction period of 72 hours, is reported in the following table for each catalyst concentration tested. See footnote 3, Table I, for definition of removal rate. Also reported is the number of recharges of 100 milligram aliquots of phenol.

TABLE IV

| Example No. | γ-MnO₂ Conc. (g./l.) | Number of Phenol Aliquots | Removal Rate | Time Required to remove Final Phenol Aliquot |
|---|---|---|---|---|
| 25 | 1 | 1 | 1.6 | 62.5 hrs. |
| 26 | 5 | 2 | 1.6 | 12.5 hrs. |
| 27 | 10 | 3 | 1.6 | 6.25 hrs. |
| 28 | 20 | 5 | 2.0 | 2.5 hrs. |
| 29 | 50 | 11 | 3.0 | 40 min. |
| 30 | 100 | 21 | 4.8 | 12.5 min. |
| 31 | 200 | 37 | 6.1 | 5 min. |
| 32 | 200 | 41 | 7.0 | 4 min. |
| 33 | 250 | 51 | 8.0 | 3 min. |

From the foregoing it will be observed that the rate of phenol removal increased to significantly practicable rates when the catalyst concentration was increased to at least about 5 percent by weight of the total system.

In a manner similar to the above examples a wide number of dissolved organic compounds are absorbed from aqueous waste streams and catalytically oxidized with gaseous oxygen which may be applied simultaneously with the adsorption contact step, or in a separate step, to regenerate catalyst. Both soluble organics and suspended organics are removed from aqueous dispersions and oxidized in accordance with the instant invention.

What is claimed is:
1. A process which comprises
   (1) contacting an aqueous dispersion of organics with a finely divided manganese dioxide catalyst having a surface area of at least 10 square meters per gram, and
   (2) contacting the manganese dioxide catalyst composition in admixture with organics of the aqueous dispersion with gaseous oxygen, the aforementioned being carried out under the following conditions:
      (a) the amount of manganese dioxide catalyst composition used being sufficient to provide a solids ratio of catalyst to organics of at least 0.5/1,
      (b) the contacting with oxygen being carried out within an essentially non-electroconductive confinement, and
      (c) the aqueous dispersion being at a pH within the range from about 5.5 to about 8.5.

2. A method as in claim 1 wherein steps (1) and (2) are carried out simultaneously within the body of liquid dispersion being treated.

3. A method as in claim 2 wherein the aqueous organic dispersion is an industrial or municipal waste stream and the amount of manganese dioxide catalyst contacted therewith is at least about 5 percent by weight of the stream.

4. A method as in claim 3 wherein the catalyst composition consists essentially of manganese dioxide.

5. A method as in claim 2 wherein the aqueous dispersion contains less than about 2 percent by weight of disperse organics.

6. A method as in claim 2 wherein the body of liquid dispersion treated is subjected to an elevated temperature up to about 500° C.

7. A process as in claim 3 wherein the temperature is within the range from about the ambient temperature of the waste up to 200° C.

8. A method as in claim 1 wherein the aqueous dispersion of organics is an industrial or municipal waste and steps (1) and (2) are carried out simultaneously at the ambient temperature of the waste, and sufficient manganese dioxide catalyst composition is used to provide at least about 5 percent by weight thereof, based on the weight of aqueous dispersion in contact with the catalyst.

9. A method as in claim 8 and including the additional step of mechanically agitating the slurry admixture of catalyst composition and aqueous dispersion of organics sufficiently to maintain the catalyst composition in suspension.

10. A method as in claim 9 wherein manganese dioxide catalyst composition consists essentially of the gamma crystalline form of manganese dioxide.

11. A process which comprises
   (1) contacting an aqueous dispersion of organics with a finely divided manganese dioxide catalyst composition having a surface area of at least 10 square meters per gram,
   (2) separating said manganese dioxide catalyst composition and captured organics from the aqueous dispersion as a sludge,
   (3) contacting the separated sludge with gaseous oxygen whereby captured organics are oxidized and the catalyst composition is then regenerated,
   the aforementioned being carried out under the following conditions:
      (a) the amount of inorganic catalyst composition used being sufficient to provide a solids ratio of catalyst to organics of at least 0.5/1, and
      (b) the aqueous dispersion being at a pH within the range from about 5.5 to about 8.5.

12. A method as in claim 11 wherein the aqueous dispersion is a municipal or industrial waste stream.

13. A method as in claim 11 wherein the catalyst composition consists essentially of manganese dioxide.

14. A method as in claim 13 wherein the manganese dioxide is in the gamma crystalline form thereof.

15. A method as in claim 11 wherein the separated sludge is heated simultaneously with the contacting by oxygen at an elevated temperature up to 500° C. and sufficient manganese dioxide catalyst composition is used to provide at least about 5 percent by weight thereof, based on the weight of aqueous dispersion in contact with the catalyst.

16. A method as in claim 15 wherein contacting with oxygen is carried out by blowing air and steam into the liquid sludge whereby captured organics are oxidized and the catalyst composition is regenerated in slurry form.

17. The method as in claim 15 wherein the heating is sufficient to dry the sludge to provide manganese dioxide solids.

18. A method as in claim 11 wherein the contacting of the sludge with gaseous oxygen is carried out within an essentially non-electroconductive confinement.

References Cited

UNITED STATES PATENTS

| | | | |
|---|---|---|---|
| 2,029,958 | 2/1936 | Urbain | 210—63 |
| 2,956,860 | 10/1960 | Welsh | 23—145 |
| 3,133,016 | 5/1964 | Stine et al. | 210—63 X |
| 3,349,031 | 10/1967 | Hatch et al. | 210—63 X |

FOREIGN PATENTS

| | | |
|---|---|---|
| 809,897 | 10/1949 | Germany. |
| 10,990 | 12/1955 | Germany. |
| 28,353 | 10/1911 | Great Britain. |

REUBEN FRIEDMAN, *Primary Examiner.*

JOHN ADEE, *Assistant Examiner.*

U.S. Cl. X.R.

210—71